(12) United States Patent
Thorn et al.

(10) Patent No.: US 10,216,267 B2
(45) Date of Patent: Feb. 26, 2019

(54) PORTABLE ELECTRONIC EQUIPMENT AND METHOD OF CONTROLLING A PORTABLE ELECTRONIC EQUIPMENT

(71) Applicant: Sony Corporation, Tokyo (JP)

(72) Inventors: Ola Thorn, Limhamn (SE); Par-Anders Aronsson, Malmo (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 245 days.

(21) Appl. No.: 14/442,591

(22) PCT Filed: May 8, 2014

(86) PCT No.: PCT/IB2014/061284
§ 371 (c)(1),
(2) Date: May 13, 2015

(87) PCT Pub. No.: WO2015/170142
PCT Pub. Date: Nov. 12, 2015

(65) Prior Publication Data
US 2016/0291690 A1 Oct. 6, 2016

(51) Int. Cl.
*G06F 3/01* (2006.01)
*G06T 7/73* (2017.01)
(Continued)

(52) U.S. Cl.
CPC .......... *G06F 3/013* (2013.01); *G06F 3/04842* (2013.01); *G06K 9/00604* (2013.01);
(Continued)

(58) Field of Classification Search
None
See application file for complete search history.

(56) References Cited

U.S. PATENT DOCUMENTS 6,388,707 B1\* 5/2002 Suda .................. H04N 5/23212
348/333.03
2008/0080846 A1 4/2008 Grip
(Continued)

FOREIGN PATENT DOCUMENTS

| CN | 101523895 A | 9/2009 |
| CN | 102063623 A | 5/2011 |

(Continued)

OTHER PUBLICATIONS

Spakov et al., "Visualization of Eye Gaze Data using Heat Maps," Elektronika ir Elektrotechnika, Jan. 2007, 5 pages.*
(Continued)

*Primary Examiner* — Hung Q Dang
(74) *Attorney, Agent, or Firm* — Renner Otto Boisselle and Sklar

(57) ABSTRACT

A portable electronic equipment comprises a gaze tracking device configured to track an eye gaze direction of a user in a time interval. The portable electronic equipment comprises a processing device coupled to the gaze tracking device and configured to generate heat map data for the eye gaze direction, generate saliency map data for a field of view of the user, and identify at least one point of interest in the field of view based on both the heat map data and the saliency map data.

20 Claims, 8 Drawing Sheets

(51) Int. Cl.
  *H04N 5/232* (2006.01)
  *G06K 9/00* (2006.01)
  *G06F 3/0484* (2013.01)
(52) U.S. Cl.
  CPC ............... *G06T 7/74* (2017.01); *H04N 5/232* (2013.01); *H04N 5/23212* (2013.01); *H04N 5/23216* (2013.01); *H04N 5/23219* (2013.01); *H04N 5/23293* (2013.01); *G06T 2207/30201* (2013.01); *G06T 2207/30241* (2013.01)

(56) References Cited

U.S. PATENT DOCUMENTS

| | | | |
|---|---|---|---|
| 2013/0050432 A1 | 2/2013 | Perez et al. | |
| 2014/0210978 A1* | 7/2014 | Gunaratne | G06K 9/00604 348/77 |
| 2014/0351836 A1* | 11/2014 | Hayashida | H04N 21/44218 725/10 |
| 2016/0005176 A1* | 1/2016 | Nguyen | G06F 3/013 382/103 |
| 2016/0309081 A1* | 10/2016 | Frahm | G06F 3/013 |

FOREIGN PATENT DOCUMENTS

| | | |
|---|---|---|
| CN | 102521595 A | 6/2012 |
| CN | 103500061 A | 1/2014 |
| WO | 2008040575 A1 | 4/2008 |
| WO | 2012008827 A1 | 1/2012 |

OTHER PUBLICATIONS

Zhang, Jing et al., "An Approach of Region of Interest Detection Based on Visual Attention and Gaze Tracking," Signal Processing Communication and Computing (ICSPCC), 2012 IEEE International Conference on, IEEE, Aug. 12, 2012, pp. 228-223, Beijing, China.

International Search Report and Written Opinion from corresponding International application No. PCT/IB2014/061284, dated Nov. 17, 2014.

Office Action dated Aug. 29, 2018 issued in corresponding Chinese application No. 201480078694.9.

Search Report dated Aug. 3, 2018 issued in corresponding Chinese application No. 201480078694.9.

Jing Zhang et al., "An approach of region of interest detection based on visual attention and gaze tracking," Aug. 15, 2012, 2012 IEEE International Conference on Signal Processing, Communication and Computing (ICSPCC 2012).

* cited by examiner

[Fig. 1]
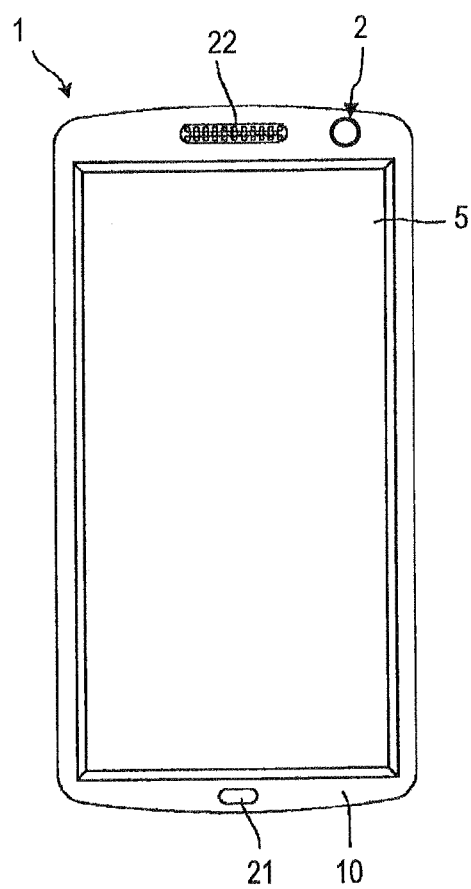

[Fig. 2]
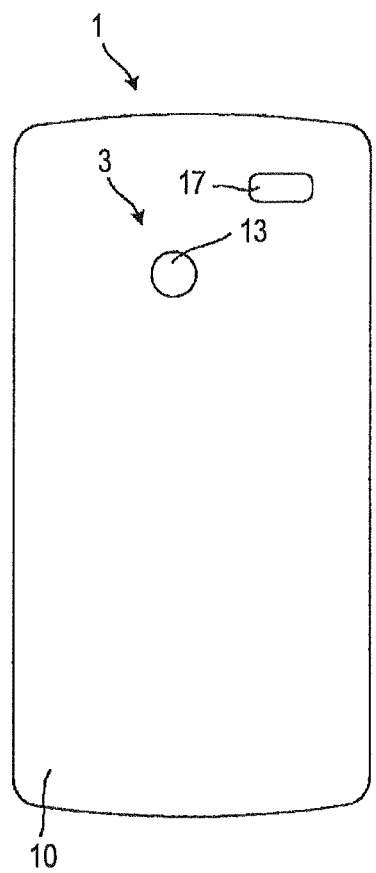

[Fig. 3]
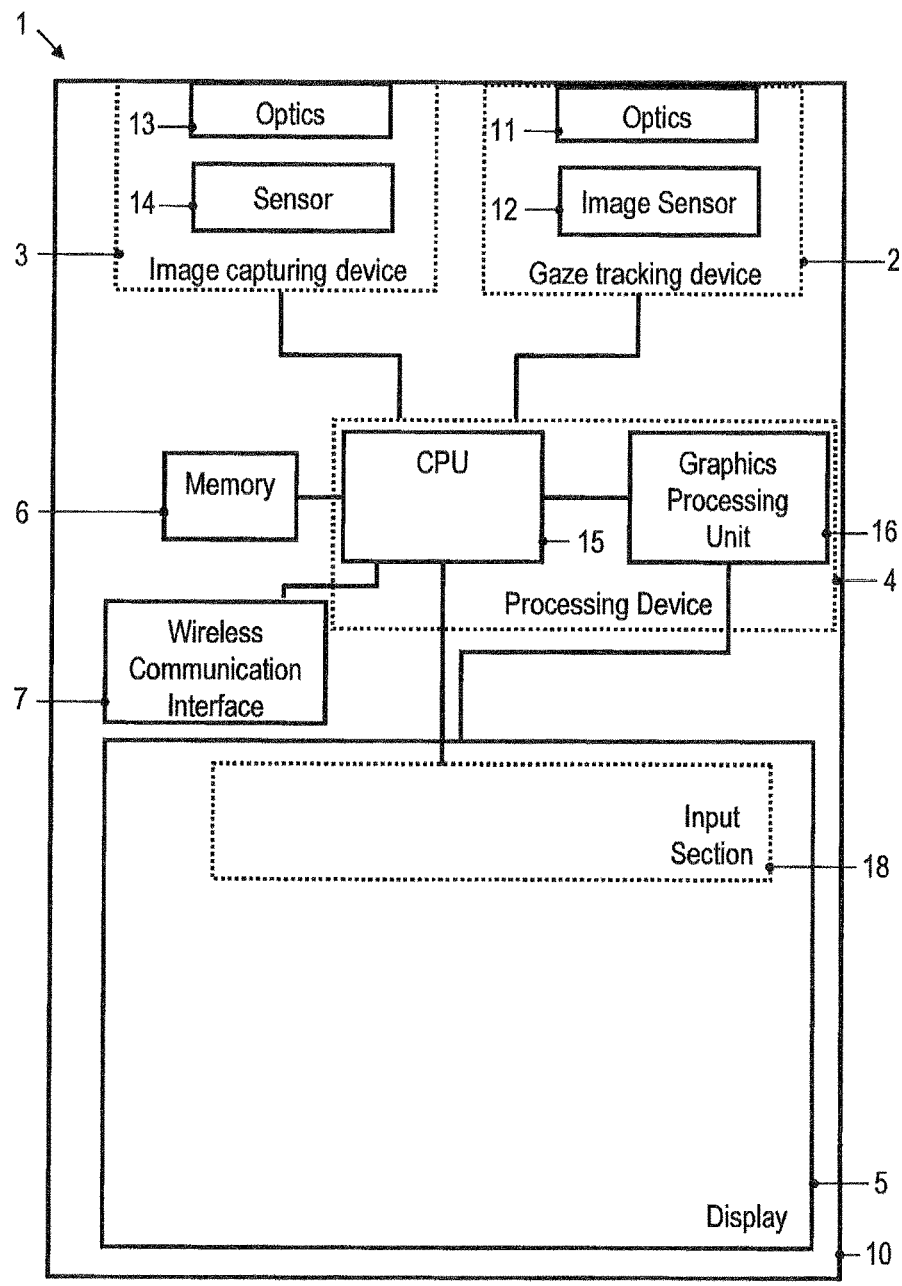

[Fig. 4]
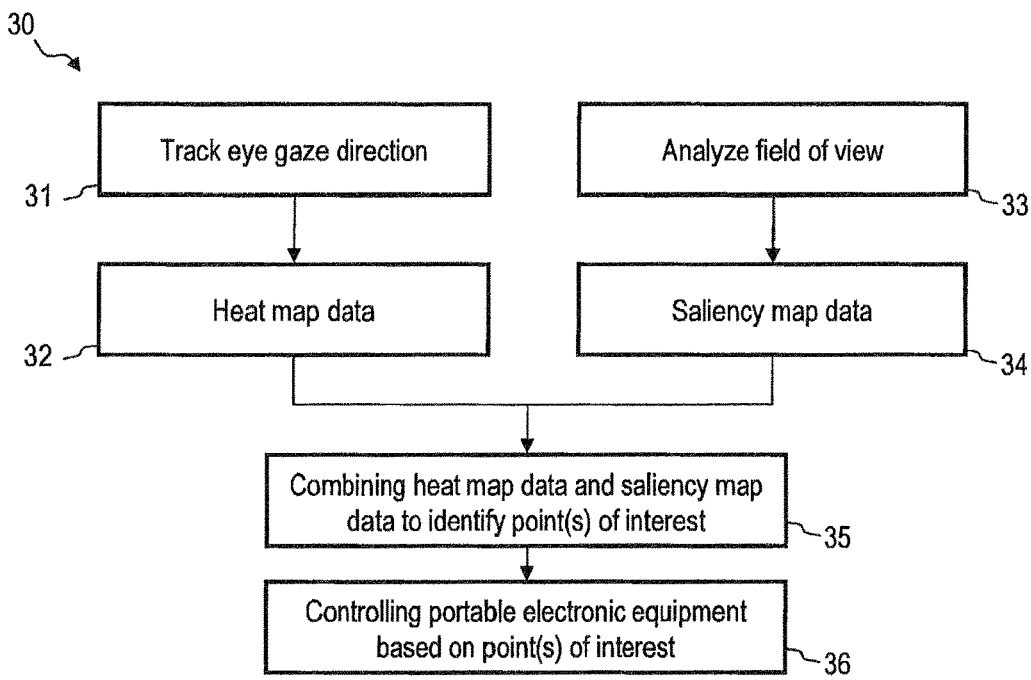
[Fig. 5]
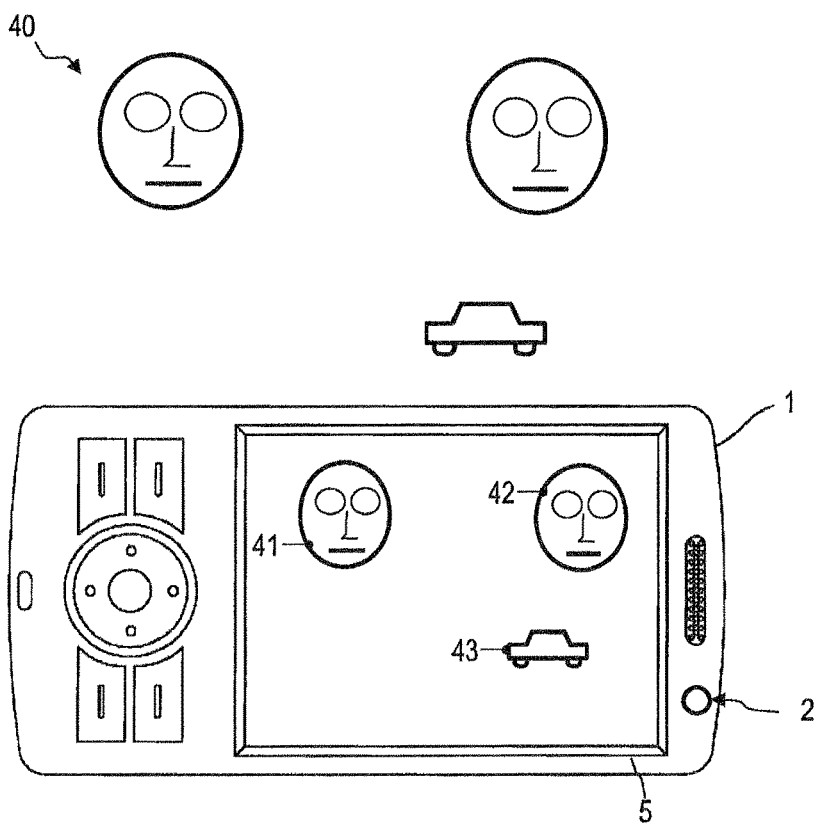

[Fig. 6]
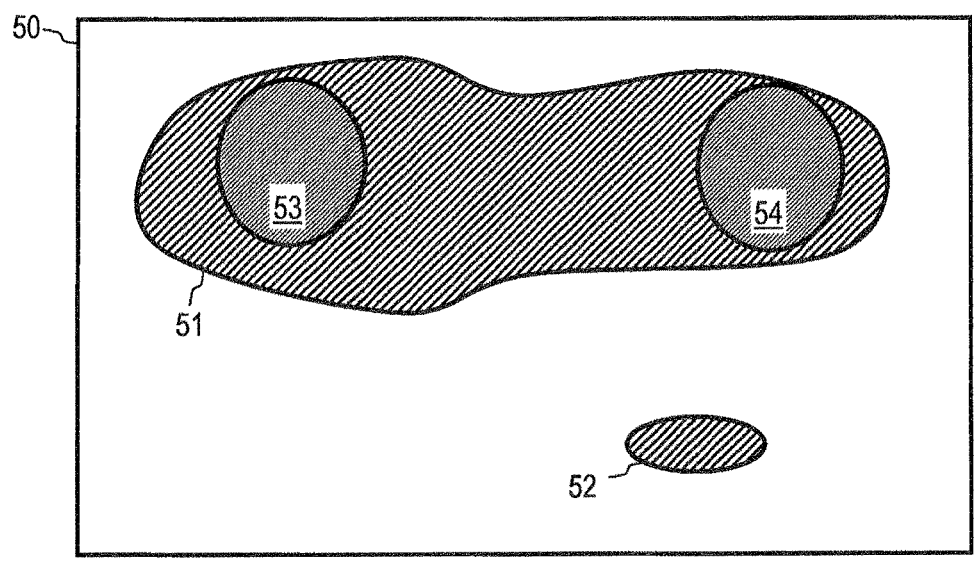
[Fig. 7]
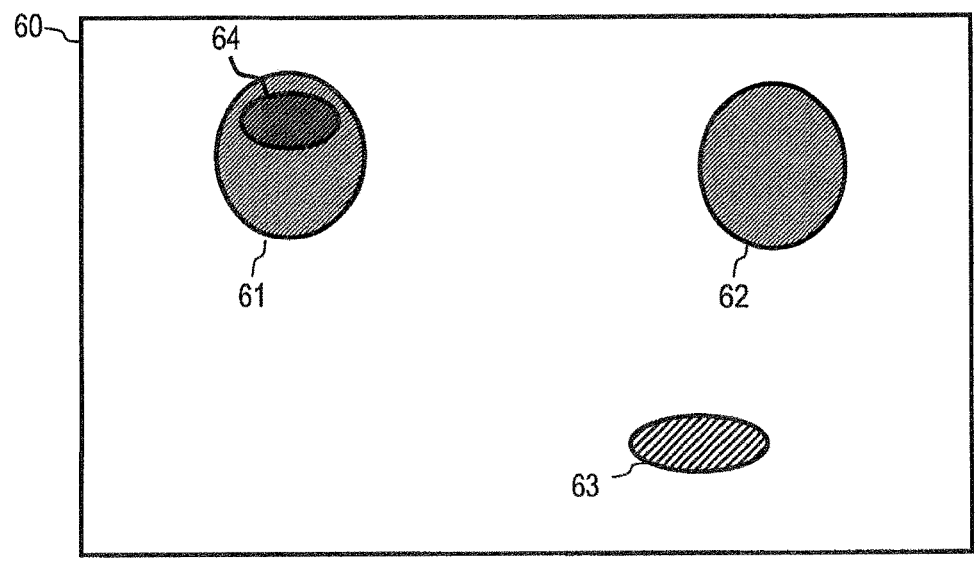

[Fig. 8]
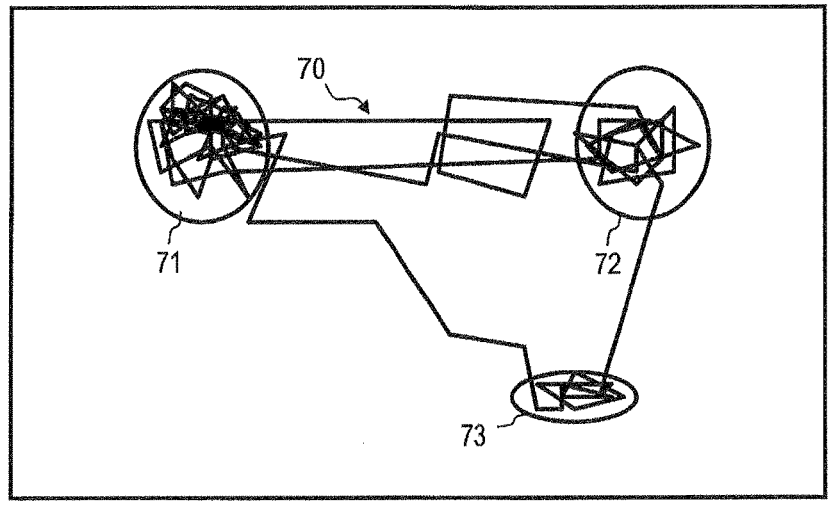
[Fig. 9]
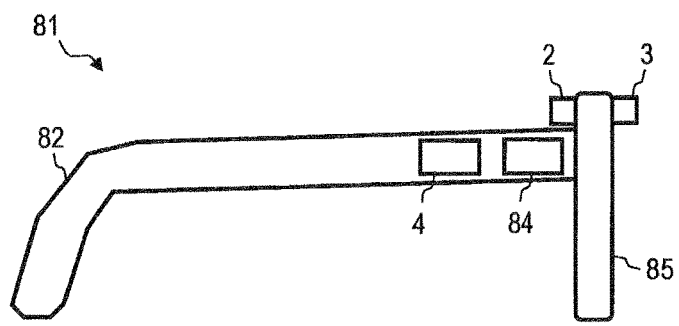
[Fig. 10]
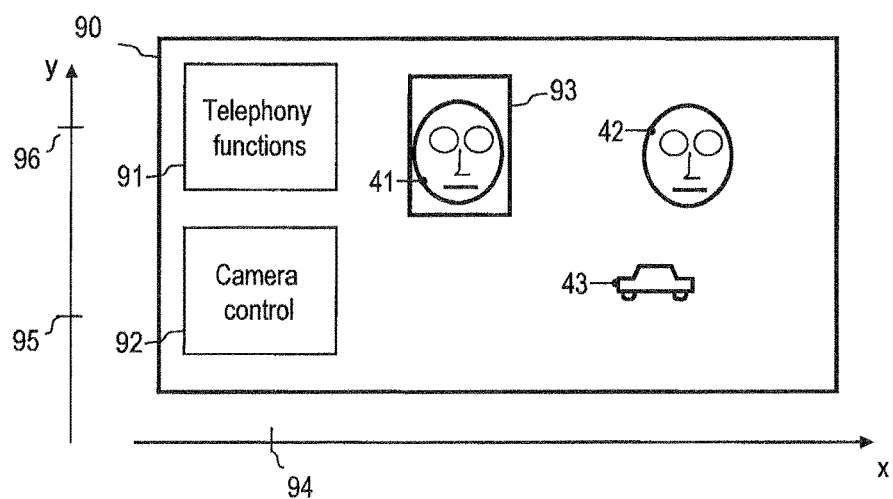

[Fig. 11]
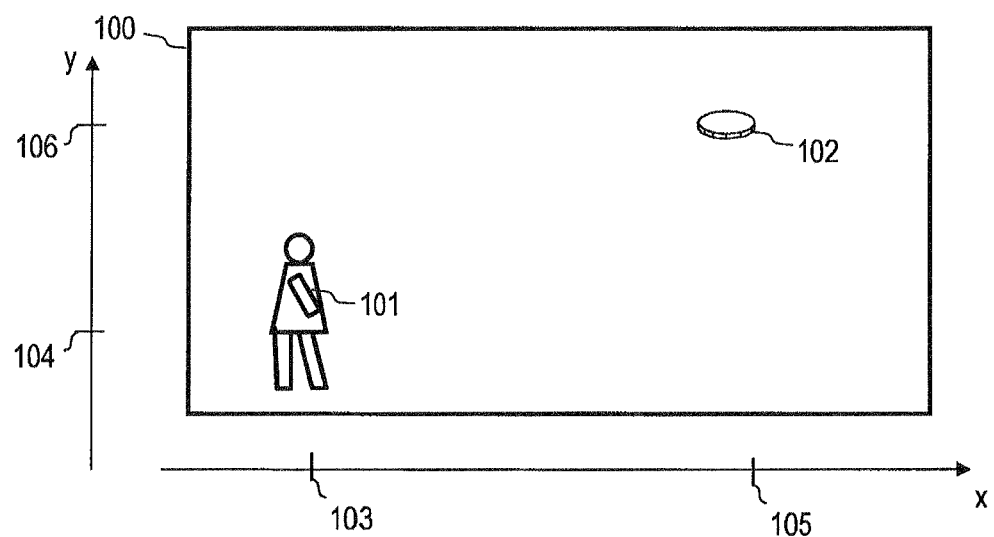

[Fig. 12]
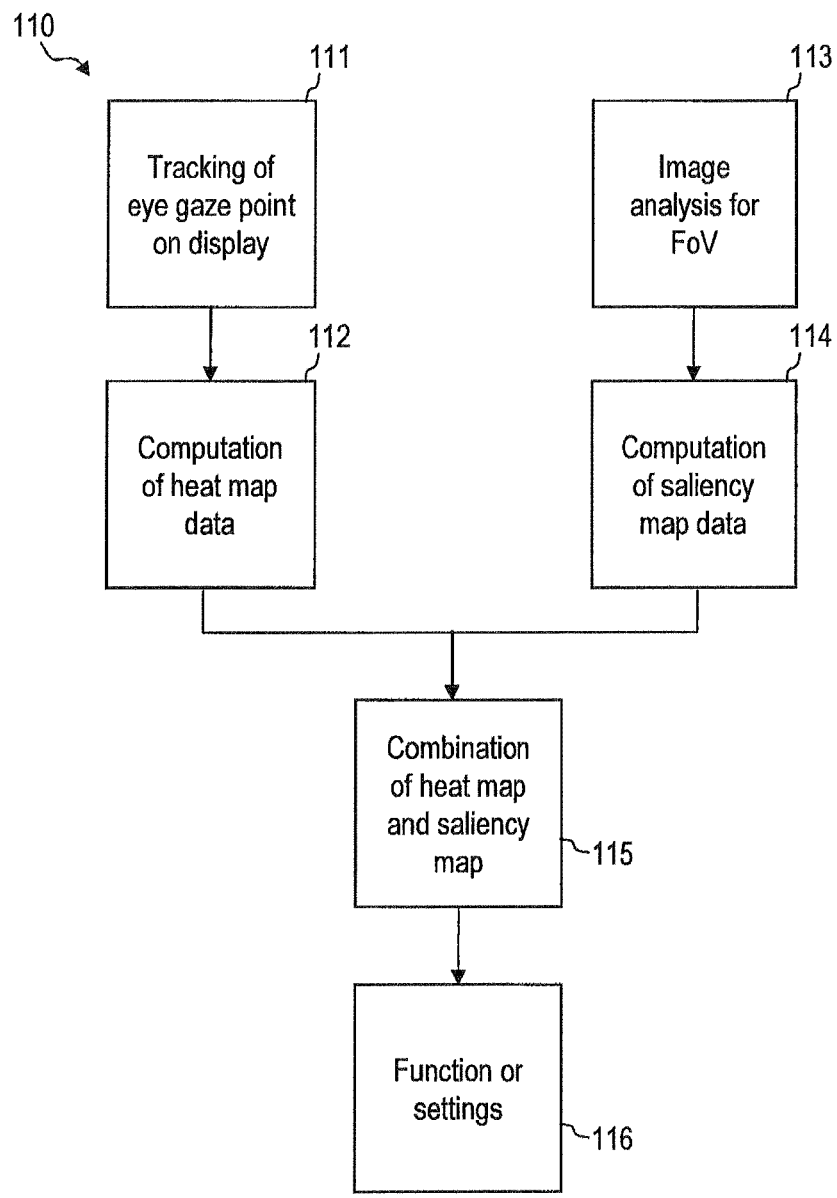

PORTABLE ELECTRONIC EQUIPMENT AND METHOD OF CONTROLLING A PORTABLE ELECTRONIC EQUIPMENT

TECHNICAL FIELD

Embodiments of the invention relate to a portable electronic equipment and to a method of controlling a portable electronic equipment. Embodiments of the invention relate in particular to portable electronic equipments which comprise a gaze tracking device operable to track an eye gaze direction of a user of the portable electronic equipment and methods of operating such portable electronic equipments.

BACKGROUND ART

Gaze based control continues to evidence increased popularity for a wide variety of electronic devices. In dedicated special application apparatuses, such as gaze based control in aircraft or surveillance applications, dedicated gaze tracking device may be operable to determine the eye gaze direction with a high accuracy.

For many portable electronic devices, such as handheld cellular communication terminals or head-mounted devices, gaze tracking may be less accurate. The reasons for this are that highly accurate, dedicated gaze tracking devices may not be attractive for portable electronic devices due to the costs and installation space requirements associated with such devices. The spatial resolution of gaze tracking which can be attained with current low-cost solutions for gaze tracking in portable electronic devices may be prone to an erroneous identification of the object the user actually is interested in.

This notwithstanding, there is a significant number of potential useful applications for gaze based control in portable electronic devices including handheld communication terminals or head-mounted displays. Examples include a prioritization of objects when using the portable electronic equipment as a camera or a prioritization among menu items which are displayed to a user on a graphical user interface. The low resolution of conventional inexpensive gaze tracking devices may reduce the user experience because it is prone to errors when detecting the points of interest, while more accurate dedicated gaze tracking devices may add to the costs of the equipment in a manner which makes them unattractive for many users.

SUMMARY

There is a need in the art for a portable electronic equipment and a method of controlling a portable electronic equipment which mitigate at least some of these shortcomings. There is in particular a need in the art for a portable electronic equipment and a method of controlling a portable electronic equipment in which the point of interest of a user may be determined more reliable even when the gaze tracking device has a small resolution.

According to embodiments of the invention, a portable electronic equipment and a method of controlling a portable electronic equipment are provided. The portable electronic equipment comprises a gaze tracking device. Data captured by the gaze tracking device are processed and combined with saliency map data for a field of view of a user. By generating the saliency map data and using the saliency map data and information on eye gaze direction in combination, the point of interest(s) at which the user is gazing may be determined more reliably, even when the gaze tracking device has a low resolution.

The gaze tracking device may comprise a video camera which is arranged to face the user when the portable electronic equipment is in use. An example for such a video camera is the low-resolution video camera of a portable telephone. By using the video camera for gaze tracking, no separate, dedicated gaze tracker must be provided.

The portable electronic equipment may comprise an image capturing device. The image capturing device and the video camera may be arranged so as to capture image data from disjoint solid angle sectors. Settings of the image capturing device may be controlled based on the point(s) of interest determined by combining the saliency map data and the data captured by the gaze tracking device.

A portable electronic equipment according to an embodiment comprises a gaze tracking device configured to track an eye gaze direction of a user in a time interval. The portable electronic equipment comprises a processing device which is coupled to the gaze tracking device. The processing device is configured to generate heat map data for the eye gaze direction. The processing device is configured to generate saliency map data for a field of view of the user. The processing device is configured to identify at least one point of interest in the field of view based on both the heat map data and the saliency map data.

The heat map data may provide spatially resolved information on the fraction of the time interval for which the gaze point has been directed to a point or region, e.g. on a display of the portable electronic equipment.

The saliency map data does not need to be generated for the full field of view of the user, but may be generated for a specific portion of the field of view. For illustration, when the portable electronic equipment has a display positioned in the field of view of the user, the saliency map may be computed for the image which is being output on the display. The saliency map data may define the saliency of image regions in a spatially depending manner.

The processing device may be configured to compute the saliency map by analyzing one or several of color, orientation, presence of edges, or other criteria which are applied to determine a variation of saliency as a function of location. Alternatively or additionally, the processing device may be configured to determine the saliency map from known positions of graphical elements in the field of view of the user, e.g. from known positions of graphical user interface elements, augmented reality elements, or game graphics which are displayed on a display of the portable electronic equipment.

The portable electronic equipment may comprise an image capturing device configured to capture at least one image of the field of view of the user. The image capturing device may be a main camera having an aperture arranged on a side of a housing of the portable electronic equipment which is opposite to the user. The image capturing device may have an aperture arranged on a side of a housing of the portable electronic equipment which is opposite to a side on which a display is arranged.

The processing device may be configured to process the at least one image of the field of view to generate the saliency map data.

The processing device may be configured to control the image capturing device based on the identified at least one point of interest. This allows a camera or video camera application of the portable electronic equipment to be controlled by gaze direction.

The processing device may be configured to set a focal point of the image capturing device based on the identified at least one point of interest. The processing device may be configured to control at least one optical component of the image capturing device to set a focal distance based on the identified at least one point of interest. The processing device may be configured to set parameters of the image capturing device which are selected from a group consisting of a focal distance, an integration time of an image sensor of the image capturing device, and an ISO sensitivity.

The gaze tracking device may comprise an image sensor which has a lower resolution than the image capturing device. The gaze tracking device may be or may comprise a video camera which is arranged on the portable electronic equipment so as to face the user when the portable electronic equipment is in use. The image sensor of the gaze tracking device and the image capturing device may face in disjoint solid angle sectors. The image sensor of the gaze tracking device and the image capturing device may face in opposite directions.

The portable electronic equipment may comprise an optical output device configured to output the at least one image captured by the image capturing device. The processing device may be configured to generate the heat map data for a gaze point on the display. This allows the user to select a real world object by gazing on the at least one image displayed on the optical output device. The optical output device may be a display.

The processing device may be configured to control the optical output device to output graphical elements in the field of view of the user, and to generate the saliency map based data on coordinates at which the graphical elements are output by the optical output device.

The processing device may be configured to determine, based on the heat map data and the saliency map data, a graphical element of the graphical elements which is the at least one point of interest. The processing device may be configured to control at least one application executed by the portable electronic equipment in response to the graphical element which is the at least one point of interest.

The graphical elements may be augmented reality elements. Alternatively or additionally, the graphical elements may be user interface elements. Alternatively or additionally, the graphical elements may be game graphics.

The processing device may be configured to process an output of the gaze tracking device to determine a gaze trajectory and to generate the heat map data from the gaze trajectory. The processing device may be configured to compute a convolution of the gaze trajectory and a non-constant function to generate the heat map data. The non-constant function may be a two-dimensional Gauss function or another two-dimension function which has a width, in the spatial domain, which corresponds to the uncertainty in gaze direction determination by the gaze tracking device.

The processing device may be configured to identify overlaps between the heat map defined by the heat map data and the saliency map defined by the saliency map data. The processing device may be configured to register the heat map data and the saliency map data against each other. The processing device may be configured to execute one or several of a k-nearest neighbor technique, a logistic regression technique, a naive Bayes technique or another technique to register the heat map data and the saliency map data against each other.

The processing device may be configured to identify a most probable gaze point by combining the heat map data and the saliency map data, and/or to prioritize several points of interest by combining the heat map data and the saliency map data.

The portable electronic equipment may be a handheld communication terminal. The portable electronic equipment may comprise a wireless interface configured for communication with a cellular communication network. The portable electronic equipment may be a cellular phone, a personal digital assistant, or a handheld computer.

The portable electronic equipment may be a head-mounted device. The portable electronic equipment may be a head-mounted display.

According to another embodiment, a system is provided which comprises the portable electronic equipment according to an embodiment and a cellular communication network, with the portable electronic equipment being connected to at least one base station of the cellular communication network.

A method of controlling a portable electronic equipment comprises monitoring an eye gaze direction of a user in a time interval. Heat map data are generated for the eye gaze direction. Saliency map data are generated for a field of view of the user. At least one point of interest is identified in the field of view based on both the heat map data and the saliency map data. The portable electronic equipment is controlled in dependence on the identified at least one point of interest.

The portable electronic equipment may comprise an image capturing device. Settings of the image capturing device may be controlled based on the identified at least one point of interest.

Further features of the method according to embodiments and the effects respectively attained thereby correspond to the features and effects of the portable electronic equipment according to embodiments.

The method may be automatically performed by a portable electronic equipment according to an embodiment.

Portable electronic equipments and methods of controlling portable electronic equipments according to exemplary embodiments may be used for controlling a camera or video camera application executed by a communication terminal or a head-mounted device, without being limited thereto.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

BRIEF DESCRIPTION OF DRAWINGS

The foregoing and additional features and advantages of the invention will become apparent from the following detailed description when read in conjunction with the accompanying drawings, in which like reference numerals refer to like elements.

FIG. 1 is a front view of a portable electronic equipment according to an embodiment.

FIG. 2 is a rear view of the portable electronic equipment of FIG. 1.

FIG. 3 is a schematic block diagram of the portable electronic equipment of FIGS. 1 and 2.

FIG. 4 is a flow chart of a method according to an embodiment.

FIG. 5 is a view illustrating operation of a portable electronic equipment according to an embodiment.

FIG. 6 illustrates a heat map determined by the portable electronic device.

FIG. 7 illustrates a saliency map determined by the portable electronic device.

FIG. 8 illustrates an eye gaze directory determined by the portable electronic device, from which the heat map is computed.

FIG. 9 is a schematic side view of a portable electronic equipment according to another embodiment.

FIG. 10 is a view illustrating a field of view of a user of the portable electronic equipment when graphical elements are generated and output.

FIG. 11 is a view illustrating a field of view of a user of the portable electronic equipment when graphical elements are generated and output.

FIG. 12 is a functional block diagram representation of a processing device of a portable electronic equipment according to an embodiment.

DESCRIPTION OF EMBODIMENTS

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations, and elements illustrated in the drawings are not necessarily shown to scale. Rather, the various elements are represented such that their function and general purpose become apparent to a person skilled in the art. Any connection or coupling between functional blocks, devices, components or other physical or functional units shown in the drawings or described herein may also be implemented by an indirect connection or coupling. Functional blocks may be implemented in hardware, firmware, software or a combination thereof.

The features of the various embodiments may be combined with each other, unless specifically noted otherwise.

A portable electronic equipment and methods of controlling a portable electronic equipment will be described. The portable electronic equipment comprises a gaze tracking device to track an eye gaze of a user of the portable electronic equipment. The gaze tracking device may be a video camera comprising an image sensor. The gaze tracking device may alternatively or additionally comprise a sensor which is sensitive in the infrared spectral range to detect the eye gaze direction using infrared probe beams. The gaze tracking device may capture several time-sequential image frames in a time interval, which represent a movement of at least one eye of the user. The portable electronic equipment may be configured to determine an eye gaze direction by determining a gaze point on a display of the portable electronic equipment, for example.

The portable electronic equipment is configured to combine the data captured by the gaze tracking device with saliency map data to determine a point of interest for the user. The portable electronic equipment may compute the saliency map data by analyzing an image captured by an image capturing device of the portable electronic equipment and/or from known positions of graphical elements which are generated by the processing device or another computer.

The portable electronic equipment is configured to use the data captured by the gaze tracking device and the saliency map data in combination to determine which regions of an image shown on a display of the portable electronic equipment may be points of interest for the user, for example. The portable electronic equipment may be configured to synchronize the heat map data and the saliency map data in the spatial domain to identify overlaps between the heat map data and the saliency map data. The portable electronic equipment may be configured to identify a most probable gaze point based on both the heat map data and the saliency map data, and/or to prioritize several points of interest based on both the heat map data and the saliency map data.

As will be explained in more detail, the portable electronic equipments and methods of embodiments allow the risk of incorrect identification of the most likely gaze point to be mitigated, even when the gaze tracking device has a low resolution as may be the case for a gaze tracking device which uses the video camera pointing towards the user to detect the gaze direction.

FIG. 1 is a front view of a portable electronic equipment 1, FIG. 2 is a rear view of the portable electronic equipment 1, and FIG. 3 is a schematic block diagram representation of the portable electronic equipment 1.

The portable electronic equipment 1 comprises a gaze tracking device 2 which is configured as a video camera facing the user, a main camera 3 and a processing device 4 coupled to the gaze tracking device 2 and the main camera 3. The processing device 4 may be one processor or may include plural processors, such as a main processor 15 and a graphics processing unit 16. The processing device 4 may have other configurations and may be formed by one or several integrated circuits such as microprocessors, microcontrollers, processors, controllers, or application specific integrated circuits.

The processing device 4 may perform processing and control operations. The processing device 4 may be configured to process several images captured by an image sensor of the gaze tracking device 2 in a time interval. The processing device 4 may compute heat map data from the several images. The processing device 4 may compute the heat map data such that the heat map data provide, for each one of a plurality of gaze points, information on the fraction of time within the time interval for which the user has been gazing towards this gaze point of towards an area around this gaze point. The processing device 4 may be configured to determine the heat map data from the movement of one eye of the user or from the movement of both eyes of the user in the time interval.

The processing device 4 may also compute saliency map data for a field of view of the user. The saliency map data may be computed for an image of the field of view, which may be captured by the main camera 3. The main camera 3 and the gaze tracking device 2 may point in opposite directions such that the main camera 3 can capture a field of view which overlaps or coincides with the field of view of the user and that the gaze tracking device 2 can monitor the eye movement of at least one eye of the user. The processing device 4 may control a display 5 of the portable electronic equipment 1 to display the image for which the saliency map is computed to the user. The processing device 4 may analyze the image captured by the main camera 3 to determine spatial variations in salience. Various processing techniques known in the art of image processing may be used to determine the saliency map data. For illustration, the saliency map data may be determined from spatial changes in object orientation, object edge orientation, color, texture, or similar. For illustration, the saliency map data may be determined by the processing device 4 based on any one or any combination of multi-scale contrast, center-surround histogram, color saliency detection, depth of field classification, spectral residual approach, global contrast based techniques, context-aware saliency map computation or other techniques.

The heat map data is indicative for the fraction of time the user spent gazing at various regions in a field of view, e.g. various regions on the display 5. The saliency map data provides information on where features which are expected to attract the user's attention are located, as a function of position in the field of view. By combining the heat map data and the saliency map data, the processing device 4 can identify the most likely gaze direction or gaze point. Alternatively or additionally, the processing device 4 may assign probabilities to each one of several regions in the field of view which are candidate points of interest. The processing device 4 may prioritize candidate points of interest according to the assigned probabilities. Alternatively or additionally, the processing device 4 may identify the n most likely points of interest at which the user has gazed, with n being an integer greater than one, by taking into account both the heat map data and the saliency map data.

The processing device 4 may register the saliency map data and the heat map data against each other, so as to have unique correspondence between pixels of the saliency map data and pixels of the heat map data in the overlap region of the heat map and the saliency map. The processing device 4 may use k-nearest neighbor, regression techniques such as logistic regression, naive Bayes techniques or other techniques to combine the saliency map data and the heat map data.

The processing device 4 may use information on the point(s) of interest for an application executed by the portable electronic equipment 1. For illustration, an application may be started which is selected based on the identified point(s) of interest which have been established based on the heat map data and the saliency map data. Additionally or alternatively, settings of at least one application executed on the portable electronic equipment 1 may be controlled based on the identified point(s) of interest which have been established based on the heat map data and the saliency map data.

The portable electronic equipment 1 may be configured for a gaze-based control of a camera function or video camera function. The image capturing device 3 of the portable electronic equipment 1 may include various components of a digital camera. The image capturing device 3 may comprise an optoelectronic element, e.g. a CCD sensor or CMOS sensor 14 which performs image sampling, to convert an optical image into image data. The image capturing device 3 may comprise a focusing optics 13. The focusing optics 13 may be adjustable. The image capturing device 3 may include additional components, such as a flashing unit, an illumination sensor, or similar.

The processing device 4 may control the image capturing device 3 to capture one image frame or a sequence of image frames which form a video. The processing device 4 may adjust settings of the image capturing device 3 based on the identified points of interest which were established by combining the heat map data and the saliency map data. The processing device 4 may set a focal length of the image capturing device 3 and/or an integration time of the sensor 14 and/or an ISO sensitivity setting based on the identified most likely gaze point of the user.

The portable electronic equipment 1 may comprise a non-volatile memory 6 or other storage device in which settings are stored for different parameters of the gaze point of the user. For illustration, once the most probable gaze point has been identified based on the heat map data and the saliency map data, the processing device 4 may control a range finder 17 to determine a distance of the object the user is gazing at. The processing device 4 may retrieve suitable settings for controlling the image capturing device 3, e.g. a focal length and/or integration time of the sensor 14, from data stored in the non-volatile memory 6.

The portable electronic equipment 1 may be operative as a portable communication device, e.g. a cellular telephone, a personal digital assistant, or similar. The portable electronic equipment 1 may include components for voice communication, which may include a microphone 21, a speaker 22, and the wireless communication interface 7 for communication with a wireless communication network. The portable electronic equipment 1 may have a manually operable user interface. The user interface may include function and control keys provided on a housing 10 of the portable electronic device, and/or a touch- or proximity-sensitive input section 18 of the display 5.

Alternatively or additionally to controlling a camera or video camera application executed by the portable electronic equipment 1, the processing device 4 may be configured to execute tasks based on the identified gaze direction of the user. The tasks may be communication related tasks associated with a communication over a wireless communication interface 7. The processing device 4 may perform a navigation task in a contact list based on the identified points of interest. The processing device 4 may start a call and/or may adjust a volume and/or may terminate a call over the wireless communication interface 7 as a function of the identified point(s) of interest. A gaze-based control of call functions can thereby be implemented.

The various components of the portable electronic equipment 1 may be integrated in a housing 10. The housing 10 may be dimensioned to allow the portable electronic equipment 1 to be a hand-held device.

The operation of the portable electronic equipment 1 will be described in more detail with reference to FIGS. 4-8 and FIGS. 10 to 12.

FIG. 4 is a flow chart of a method 30 according to an embodiment. The method 30 may be performed by the portable electronic equipment 1.

At 31, gaze tracking is performed to track an eye gaze direction of one eye or both eyes of a user. A convergence point of the eye gaze directions of both eyes may be determined. The eye gaze direction may be tracked in a time interval to obtain statistics on preferred gaze directions which the user has been looking at more frequently than other gaze directions. The eye gaze direction may be recorded for a plurality of times in a time interval. The eye gaze direction may be recorded by a gaze tracking device which can fulfill other functions in the portable electronic equipment. For illustration, the gaze tracking device may be a video camera arranged on the same side of the housing 10 so as to point towards the user in operation of the portable electronic equipment 1, as may be desired for video calls.

At 32, heat map data are computed from the information collected by the gaze tracking device. The heat map data may define, for several points or several regions, the fraction of time in the time interval for which the user has been gazing at the respective point or region. A convolution between the points on an eye gaze trajectory and a non-constant spread function $f(x, y)$ may be computed to determine the heat map data, where $f(x, y)$ may be a Gaussian curve, a Lorentz function, or another non-constant function which takes into account that the gaze tracking device has a limited resolution. The heat map data may alternatively be computed by computing, for each one of several pixels on the display 5, the fraction of time for which the user has been gazing at the respective pixel when taking into account the probability spreading caused by the resolution of the gaze tracking device, for example. Various other techniques from the field of gaze tracking may be used to compute the heat map data.

At 33, saliency of features in a field of view of the user may be determined. To determine the saliency, an image overlapping with the field of view of the user may be captured and analyzed.

At 34, saliency map data may be computed. The saliency map data may be computed for one image captured by the image capturing device 3 while the gaze tracking device simultaneously monitors the gaze direction of the user. The saliency map data may be computed, for example, by any one or any combination of multi-scale contrast, center-surround histogram, color saliency detection, depth of field classification, spectral residual approach, global contrast based techniques, context-aware saliency map computation or other techniques.

At 35, the heat map data and the saliency map data are combined. One or several points of interest may be identified which correspond to the one most likely or the several most likely points and directions for the user's gaze. The heat map data and the saliency map data may be registered against each other, so as to synchronize them in the spatial domain. The heat map data and the saliency map data may be combined in any one of a variety of ways. For illustration, pixel-wise nearest neighbor techniques, regression analysis, naive Bayes or other techniques may be used to determine the most likely gaze direction.

At 36, at least one function of the portable electronic equipment may be controlled based on the identified most probable gaze point or the n most probable gaze points, where n is an integer. Parameters of the image capturing device 3 may be automatically set based on the most probable gaze point. Alternatively or additionally, the user may be allowed to select one of the n most probable gaze points. The selection may be made over an input device 18 of the portable electronic equipment.

FIG. 5 shows the portable electronic equipment 1 according to an embodiment when a camera function or video camera function is activated. An image captured by the image capturing device 3 may be displayed on the display 5. The gaze tracking device 2 may monitor the user's eye gaze direction when the user's gaze is directed onto the display 5 and/or when the user's gaze is directed onto the real-world scene 40 which is also shown in the display 5.

By monitoring the user's gaze direction at a plurality of times in a time interval, statistics may be obtained which defines the fractions of time for which the user has been gazing at each one of several objects 41-43. The heat map data may thereby be determined.

By analyzing the image captured by the image capturing device 3 and shown on the display 5, the saliency map data may be determined. The saliency map data may indicate the regions representing objects 41-43, which are clearly distinguished from their surrounding.

By combining the saliency map data and the heat map data, the reliability in determining the object, e.g. object 41, which is the most probable gaze point of the user may be improved.

Once the most probable gaze point(s) have been identified, the processing device 4 may control the image capturing device 3 to take an image which is to be stored and/or processed further in the portable electronic equipment 1 and/or which is to be transmitted over a wireless communication interface of the portable electronic equipment 1.

FIG. 6 shows an exemplary heat map 50. The heat map 50 may comprise a plurality of pixels, and the heat map data may comprise the pixel values of the plurality of pixels of the heat map 50. The number of pixels in the heat map 50 may be smaller than the number of pixels of an image captured by the image capturing device 3, due to the smaller resolution of the gaze tracking device 2, for example.

The heat map data provide information on regions 51-54 at which the user has been gazing. In FIG. 6, the fraction of time for which the user has been gazing in the respective regions is indicated by the spacing between the hatched lines. The fraction of time for which the user has been gazing into areas 51, 52 which surround the objects 41, 42 and correspond to object 43, respectively, is less than the fraction of time the user has been gazing at areas 53, 54 which correspond to objects 41, 42.

The identification of the point(s) of interest that is based on the heat map data alone may have limitations, in particular when the spatial resolution of the gaze tracking device is small. The portable electronic equipment according to embodiments addresses these shortcomings by combining the heat map data with the saliency map data.

FIG. 7 shows an exemplary saliency map 60. The saliency map 60 may comprise a plurality of pixels, and the saliency map data may comprise the pixel values of the plurality of pixels of the saliency map 60. The number of pixels of the saliency map 60 may be greater than the number of pixels of the heat map 50. The saliency map 60 may have a higher spatial resolution than the heat map 50.

The saliency map data may provide information on regions 61-64 in which objects which are likely to draw the user's attention are located. The regions 61-64 may be identified by taking into account one or several of contrast, color, depth of field, and/or edge orientation of features shown in an image captured by the image capturing device 3. For illustration, the saliency map data and the information on the regions 61-64 may be determined based on any one or any combination of multi-scale contrast, center-surround histogram, color saliency detection, depth of field classification, spectral residual approach, global contrast based techniques, context-aware saliency map computation or other techniques.

In FIG. 7, the saliency, i.e. the pixel values of the saliency map 60, are indicated by the spacing of the hatched lines. The region 64 is the region having the highest pixel values in the saliency map.

By combining the heat map data with the saliency map data, it becomes possible to more reliably determine the region which corresponds to the most probable point of interest. The spatial resolution of determining the eye gaze direction may optionally also be improved. For illustration, by using the saliency map data, it becomes possible to identify a region 64 to be the most probable point of interest, even when that region 64 has a size which is smaller than the resolution of the gaze tracking device.

The heat map data for the gaze direction may be determined in various ways. In some implementations, the gaze tracking device may monitor a trajectory of the gaze direction.

FIG. 8 illustrates an exemplary gaze trajectory 70. The gaze trajectory 70 may be determined by the gaze tracking device 2. Statistics on the likelihood of the gaze direction being directed onto a certain region on the display 5 may be obtained from the gaze trajectory. Thereby, the processing device may identify regions 71-73 in which the heat map data have values greater than in the surrounding regions.

The portable electronic equipment according to embodiments may be a hand-held device. Other implementations may be used, as will be explained with reference to FIG. 9. For illustration, the portable electronic equipment according to an embodiment may be a head-mounted device, such as a head-mounted display, or another body mounted device.

FIG. 9 shows a portable electronic equipment 81 according to another embodiment. The portable electronic equipment 81 is a head-mounted device. The portable electronic equipment 81 comprises a gaze tracking device 2 which may comprise a video camera. The portable electronic equipment 81 may optionally comprise an image capturing device 3. The image capturing device 3 may be used for capturing an image of a field of view of the user. The processing device 4 may analyze the image of the field of view for overlaying augmented reality objects onto a real-world view, for example.

The portable electronic equipment 81 may comprise an optical output device 84 configured to display graphical elements on a surface 85. The surface 85 may be configured to allow a user to see a real-word environment through the surface 85. Alternatively or additionally, the surface 85 may comprise a display which is controlled by the processing device 4.

In operation, the processing device 4 may be configured to determine heat map data based on an output of the gaze tracking device 2. The processing device 4 may be configured to determine saliency map data. The saliency map data may be determined by processing an image captured by the image capturing device 3. Alternatively or additionally, and as will be explained in more detail with reference to FIG. 10 and FIG. 11, the saliency map data may also be computed based on knowledge of locations at which graphical elements are output to the user.

FIG. 10 is a view 90 of a display 5 of the portable electronic equipment 1 according to an embodiment or of the surface 85 of the portable electronic equipment 81 according to an embodiment, which is located in the field of view of the user.

Objects 41-43 of a real-world view may be displayed in the field of view of the user. User interface elements 91, 92 may be generated as computed generated graphics and may be displayed in the field of view of the user. The user interface elements 91, 92 may be generated by the processing device 4, for example. The positions of the user interface elements 91, 92 are known to the processing device 4, even without any image analysis. The processing device 4 may compute the saliency map data based on the knowledge of the positions of the user interface elements 91, 92. The positions may be defined by coordinates 94-96 of the user interface elements 91, 92. Additionally or alternatively, the processing device 4 may compute the saliency map data based on the knowledge of the positions of one or several augmented reality elements 93 which are overlaid onto a real-world image. The processing device 4 may compute the saliency map data based on the knowledge of the positions of the augmented reality elements 93.

Additionally or alternatively to controlling a camera, the processing device 4 may activate other functions in response to detecting the probable points of interest of the user based on the combination of the heat map data and saliency map data. For illustration, the processing device 4 may perform call-based control functions in response to detecting that the user gazes at a user interface element 91 associated with call-based control functions.

FIG. 11 is a view 100 of a display 5 of the portable electronic equipment 1 according to an embodiment or of the surface 85 of the portable electronic equipment 81 according to an embodiment, which is located in the field of view of the user.

As shown in FIG. 11, graphical elements 101, 102 in the field of view of the user may be computer generated graphical elements, e.g. game graphics. The processing device 4 may compute the saliency map data from the known positions of the graphical elements 101, 102. The positions may each be defined by a pair of coordinates 103, 104 or 105, 106, respectively. No real-world image of the user's field of view must be captured to determine the saliency map. The positions are known to the processing device 4 which generates the game graphics.

FIG. 12 is a block diagram representation 110 of a processing device 4 according to an embodiment, which shows functional modules of the processing device. The functional modules may be implemented in hardware, software, firmware, or a combination thereof.

The processing device 4 may have a gaze tracking module 111 for evaluating an output of a gaze tracking device. The gaze tracking module 111 may compute and record the gaze point, e.g. on a display of the portable electronic equipment, for a plurality of times in a time interval.

The processing device 4 may have a computation module 112 for computing the heat map data. The computation module 112 may be configured to compute statistics for the data collected by the gaze tracking module 111. The computation module 112 may compute heat map data which define the probability for the user to look in a certain direction or at a certain point, respectively for each one of several gaze directions.

The processing device 4 may have an image analysis module 113 for analyzing an image of a field of view of the user. The image analysis module 113 may identify one or several features in the image. The image analysis module 113 may perform an edge detection to detect an orientation of object edges in the image, for example.

The processing device 4 may have a computation module 114 for computing saliency map data. The computation module 114 may compute pixel values of a saliency map.

The processing device 4 may have a combination module 115 for combining the heat map data and the saliency map data. The combination module 115 may be configured to determine, based on the heat map data and the saliency map data, the most probable gaze point or the most probable gaze points of the user. The combination module 115 may be configured to determine the most probable gaze point with a spatial resolution which is higher than that of the heat map data, by taking advantage of the spatial resolution of the saliency map data. The combination module 115 may be configured to synchronize the heat map data and the saliency map data in the spatial domain and the time domain.

The processing device 4 may have a control module 116 which controls execution of a function or which adjusts settings of the portable electronic equipment 1, in dependence on the identified point(s) of interest which are the most probable gaze points of the user.

While portable electronic equipments and methods of controlling portable electronic equipments have been described with reference to the drawings, modifications and alterations may be implemented in further embodiments. For illustration rather than limitation, while exemplary implementations for gaze tracking devices have been described, other or additional sensor componentry may be used. For illustration, a dedicated sensor may be provided for tracking the eye gaze direction. The dedicated sensor may be an infrared sensor which detects reflections of infrared light to establish the eye gaze direction. The gaze tracking device may, but does not need to be a sensor which is sensitive in the visible spectral range.

For further illustration, while the portable electronic equipment may be a hand-held device or a head-mounted device, the portable electronic equipment may also have other configurations.

For still further illustration, various configurations of the processing device of the portable electronic equipment may be implemented. The processing device may include plural processors, with one of the processors being a dedicated graphics unit processor which controls the optical output unit and additionally performs steps of methods of embodiments. The processing device may consist of only one processor in other embodiments.

Examples for portable electronic equipments which may be configured as described herein include, but are not limited to, a mobile phone, a cordless phone, a personal digital assistant (PDA), a head mounted display, and the like.

The invention claimed is:

1. A portable electronic equipment, comprising:
   a gaze tracking device configured to track an eye gaze direction of a user in a time interval;
   a processing device coupled to the gaze tracking device and configured to
      generate heat map data for the eye gaze direction, wherein the heat map data provides, for each one of a plurality of gaze points, information on the fraction of time within the time interval for which the user has been gazing towards this gaze point or towards an area around this gaze point;
      generate saliency map data for a field of view of the user;
      combine the heat map data with the saliency map data to provide a combined data map; and
      identify at least one point of interest in the field of view based on the combined data map.

2. The portable electronic equipment of claim 1, further comprising:
   an image capturing device configured to capture at least one image of the field of view of the user,
   wherein the processing device is configured to process the at least one image of the field of view to generate the saliency map data.

3. The portable electronic equipment of claim 2,
   wherein the processing device is configured to control the image capturing device based on the identified at least one point of interest.

4. The portable electronic equipment of claim 3,
   wherein the processing device is configured to set a focal point of the image capturing device based on the identified at least one point of interest.

5. The portable electronic equipment of claim 2,
   wherein the gaze tracking device comprises an image sensor which has a lower resolution than the image capturing device.

6. The portable electronic equipment of claim 2, further comprising:
   an optical output device configured to output the at least one image captured by the image capturing device,
   wherein the processing device is configured to generate the heat map data for a gaze point on the optical output device.

7. The portable electronic equipment of claim 1,
   wherein the portable electronic equipment comprises an optical output device, and
   wherein the processing device is configured to
      control the optical output device to output graphical elements in the field of view of the user, and
      generate the saliency map data based on coordinates at which the graphical elements are output by the optical output device.

8. The portable electronic equipment of claim 7,
   wherein the processing device is configured to determine, based on the heat map data and the saliency map data, a graphical element of the graphical elements which is the at least one point of interest.

9. The portable electronic equipment of claim 7,
   wherein the graphical elements are selected from a group consisting of:
      augmented reality elements;
      graphical user interface elements; and
      game graphics.

10. The portable electronic equipment of claim 1,
    wherein the processing device is configured to process an output of the gaze tracking device to determine a gaze trajectory and to generate the heat map data from the gaze trajectory.

11. The portable electronic equipment of claim 1,
    which is a handheld communication terminal.

12. The portable electronic equipment of claim 1,
    which is a head-mounted device.

13. The portable electronic equipment of claim 1, wherein the heat map data is indicative of a fraction of time the user spent gazing at various regions in a field of view.

14. A method of controlling a portable electronic equipment, comprising:
    monitoring an eye gaze direction of a user in a time interval;
    generating heat map data for the eye gaze direction, wherein the heat map data provides, for each one of a plurality of gaze points, information on the fraction of time within the time interval for which the user has been gazing towards this gaze point or towards an area around this gaze point;
    generating saliency map data for a field of view of the user;
    combining the heat map data with the saliency map data to provide a combined data map;
    identifying at least one point of interest in the field of view based on the combined data map; and
    controlling the portable electronic equipment in dependence on the identified at least one point of interest.

15. The method of claim 14,
    wherein the portable electronic equipment comprises an image capturing device, and
    wherein controlling the portable electronic equipment comprises:
    adjusting settings of the image capturing device based on the identified at least one point of interest.

16. The method of claim 15, which is performed by the portable electronic equipment
    wherein controlling the portable electronic equipment comprises:
       setting a focal point of the image capturing device based on the identified at least one point of interest.

17. The method of claim 15,
    wherein the portable electronic equipment comprises a gaze tracking device which monitors the eye gaze direction of the user, the gaze tracking device comprising an image sensor which has a lower resolution than the image capturing device.

18. The method of claim 15, further comprising:
outputting, by an optical output device of the portable electronic equipment, at least one image captured by the image capturing device,
wherein the heat map data is generated for a gaze point on the optical output device.

19. The method of claim 14,
wherein the portable electronic equipment comprises an optical output device,
wherein the method further comprises outputting graphical elements in the field of view of the user, and
wherein the saliency map data are generated based on coordinates at which the graphical elements are output by the optical output device.

20. The method of claim 19,
wherein identifying at least one point of interest comprises:
 determining, based on the heat map data and the saliency map data, a graphical element of the graphical elements which is the at least one point of interest.

* * * * *